US005417903A

United States Patent [19]

Harrison et al.

[11] Patent Number: 5,417,903

[45] Date of Patent: May 23, 1995

[54] MANUALLY OPERATED, CONTROLLED DOSE PILL PRESS

[75] Inventors: Roger G. Harrison, Zionsville, Ind.; Terry M. Haber, Lake Forest, Calif.; William H. Smedley, Lake Elsinore, Calif.; Clark B. Foster, Laguna Niguel, Calif.

[73] Assignee: Habley Medical Technology Corporation, Laguna Hills, Calif.

[21] Appl. No.: 143,211

[22] Filed: Oct. 26, 1993

[51] Int. Cl.[6] .......... B29C 43/02

[52] U.S. Cl. .......... 264/109; 264/123; 425/357; 425/412; 425/422

[58] Field of Search .......... 264/109, 123; 425/357, 425/412, 422, 406

[56] References Cited

U.S. PATENT DOCUMENTS 4,100,598 7/1978 Stiel et al. .......... 264/109

5,234,646 8/1993 Tanino et al. .......... 264/123

*Primary Examiner*—Mary Lynn Theisen

*Attorney, Agent, or Firm*—Townsend & Townsend Khourie & Crew

[57] ABSTRACT

A pill press (2), allowing the user to personally press pills (78) of a desired dose, includes a housing (4) having an interior (14) within which a supply of powdered pharmaceutical (36) is contained and a pill cavity form (22) mounted to the housing. Powdered pharmaceutical is transferred to the pill forming cavity (46) of the pill cavity form according to the dose desired. A manually operated pill ram (48) is used to compress the powdered pharmaceutical within pill forming cavity to create the pill. The pill ram is then withdrawn from the pill forming cavity and the pill is automatically ejected from the pill press through a pill outlet (82) formed in the housing by an ejector rod (56).

23 Claims, 5 Drawing Sheets

MANUALLY OPERATED, CONTROLLED DOSE PILL PRESS

BACKGROUND OF THE INVENTION

In some cases the therapeutic value of a pharmaceutical is dependent upon delivery of a dose tailored to the individual. An adult male weighing 150 pounds (68 Kg) could require only 80% of the dose for someone weighing 185 pounds (84 Kg). In some cases, slight overdosing does not have any negative therapeutic affects. However, for some medicines and for certain individuals who are sensitive to pharmaceuticals in general, administering the precise dose can be a health concern. Also, some pharmaceuticals are very expensive so that even if a 30% overdose does not harm the patient in any way, the excess pharmaceutical being dispensed can be quite costly. Therefore, for maximum therapeutic effectiveness and to avoid problems associated with over or under medicating a patient, the dose of some pharmaceuticals should be accurately adjusted to the particular patient.

Pharmaceuticals which are injected or given orally in liquid form can be quite accurately dispensed as to dose. However, many pharmaceuticals are dispensed in pill form. While pill cutters can be used to halve or quarter many pills, this somewhat messy process does not provide a great deal of flexibility for accuracy in dosage.

SUMMARY OF THE INVENTION

The present invention provides a user with a personal pill press, that is a manually operated, controlled dose pill press by which a pill containing the desired amount of a powdered pharmaceutical can be created easily and quickly by the user using a relatively simple mechanism. This invention not only eliminates waste, but helps to ensure that dose-sensitive pharmaceuticals are properly administered and that dose-sensitive patients are not over or under dosed.

The pill press allows the user to personally press pills of a desired dose for use. A pill press includes a housing having an interior within which the powdered pharmaceutical is contained. A cavity form is mounted to the housing and defines a pill forming cavity. To press a pill, an amount of the powdered pharmaceutical in the housing is transferred to the pill forming cavity according to the dose desired. A manually operated pill ram assembly is used to compress the powdered pharmaceutical within pill forming cavity to create the pill.

A portion of the pill ram which actually forms the pill is preferably configured so that the formed pill is withdrawn from the pill forming cavity by the withdrawal of the pill ram assembly from the use position, at which the pill is pressed, towards a retracted position. During this movement, the pill is preferably automatically ejected from the pill press at a pill outlet opening in the housing.

One of the primary advantages of the invention is that it is designed for use by an individual. Being manually operated and in simple construction, the cost should be relatively low. However, the invention allows the user to control the pharmaceutical dose by determining the size of the pill to be pressed. This can be accomplished in a number of ways, with the disclosed embodiment being demonstrative of one example.

Another advantage of the invention is that the pill can be dispensed without the need for opening up the pill press. In a preferred embodiment, the action of moving the pill ram assembly from the use position to the retracted position causes an ejector element to drive the pill from the pill-containing ram portion of the pill ram out of a pill outlet in the housing.

Other features and advantages of the invention will appear from the following description in which the preferred embodiment has been set forth in detail in conjunction with the accompanying drawings.

DESCRIPTION OF THE PREFERRED EMBODIMENT

Figure 1:
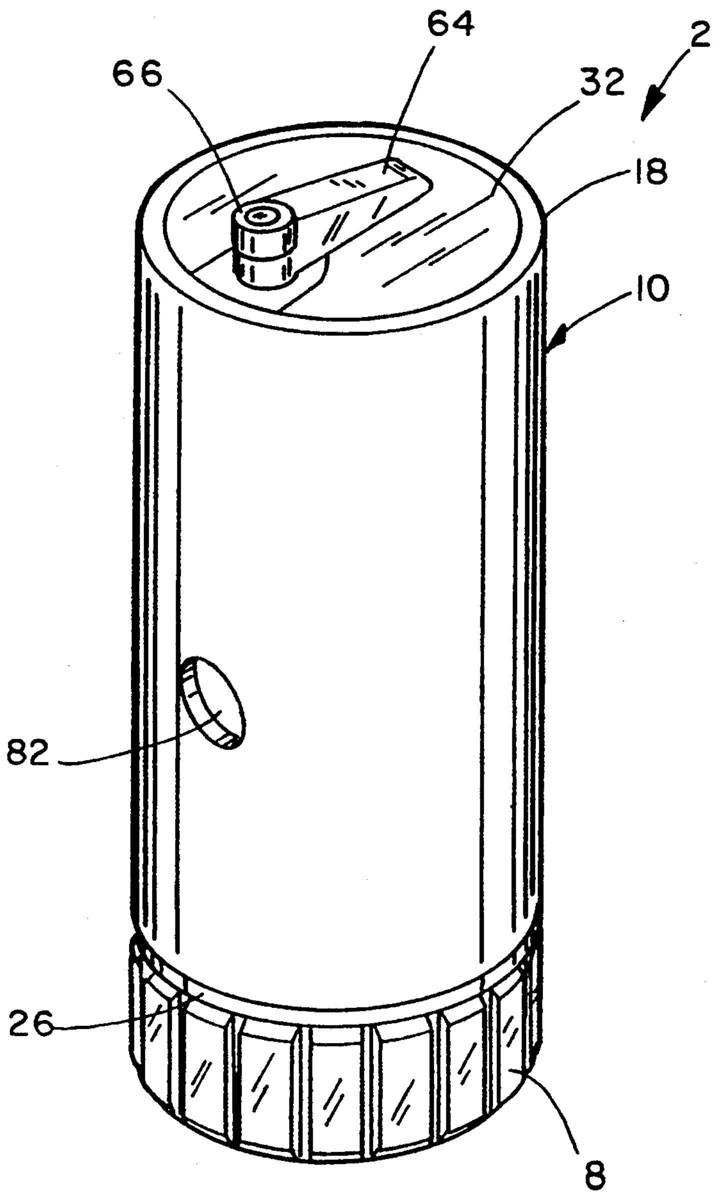
FIG. 1 is an overall view of a pill press made according to the invention.
Figure 2:
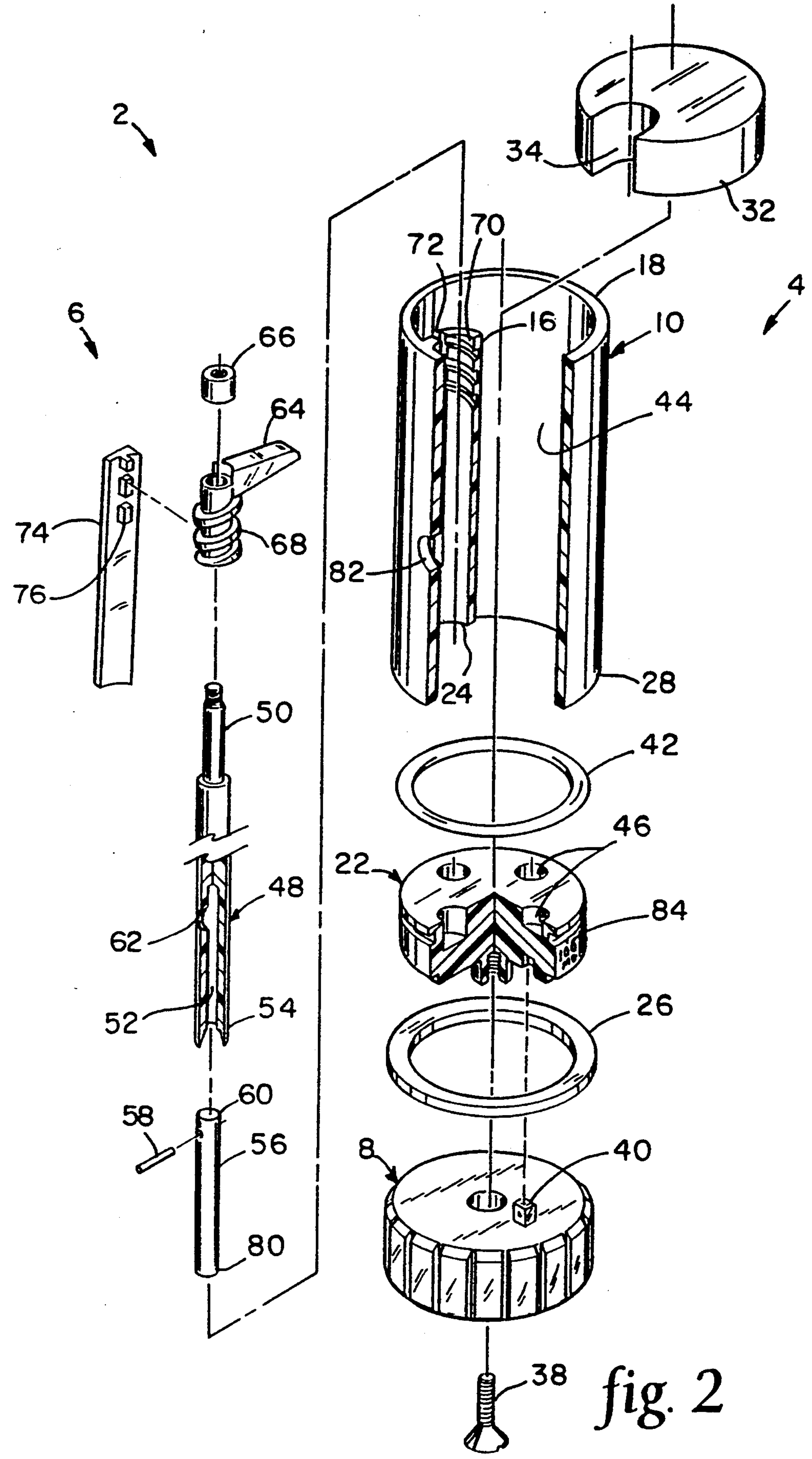
FIG. 2 is an exploded isometric view of the pill press of FIG. 1.

The figures illustrate a manually operated, controlled dosed pill press 2 which broadly includes a housing 4, a pill ram assembly 6 mounted within housing 4 and a dosing knob 8 rotatively mounted to housing 4.

Housing 4 includes a generally cylindrical main body 10 which has a central axis 12 through its interior 14. Housing 4 includes a generally cylindrical ram guide 16 oriented parallel to but offset from axis 12. Ram guide 16 extends from upper, proximal rim 18 of main body 10 to a position 20 adjacent a rotatable cavity form 22. Cavity form 22 is mounted to housing 4 and is held in place between the distal end 24 of ram guide 16 and a retaining ring 26 secured to the distal end 28 of main body 10, typically using a suitable adhesive; a threaded retaining ring 26 could also be used. The proximal end 30 of main body 10 is enclosed by a top cap 32. Top cap 32 is secured to both main body 10 and ram guide 16, also typically using an appropriate adhesive. Top cap 32 has a C-shaped opening 34 formed therein to accommodate ram guide 16.

The portion of interior 14 of main body 10 between top cap 32 and cavity form 22 contains a supply of a powdered pharmaceutical 36. Dosing knob 8 is secured to cavity form 22 by the use of a screw 38 and a key 40. Key 40 engages a complementary opening formed in the distal end of cavity form 22 so that upon rotating dosing knob 8, cavity form 22 also rotates around central axis 12. To keep pharmaceutical 36 from escaping past cavity form 22, cavity form 22 has an O-ring 42 which provides a seal between cavity form 22 and the inner wall 44 of main body 10.

Cavity form 22 has four offset pill forming cavities 46, each cavity having a different depth to permit different dose pills to be made. Each pill forming cavity 46 is in a position so that the user can align it with ram guide 16 when desired. Each pill forming cavity 46 can also be positioned misaligned from ram guide 16 and thus opening into interior 14 of main body 10. When at this position, powdered pharmaceutical 36 can enter pill forming cavity 46. The user can then once again relocate pill forming cavity 46 beneath distal end 24 of ram guide 16 for the operation of pill ram assembly 6 as discussed below.

Pill ram assembly 6 includes a pill ram 48. Pill ram 48 has a reduced diameter proximal end 50 and a hollow interior 52 extending almost halfway through pill ram 48 from its distal end 54. An ejector rod 56 is housed within hollow interior 52. Ejector rod 56 has a radially extending pin 58 extending from its proximal end 60 out through a short axial slot 62 formed in pill ram 48.

Pill ram assembly 6 also includes a ram screw lever 64 which mounts on to the reduced diameter portion 50 of pill ram 48. Lever 64 is secured to end 50 by a nut 66 engaging the threaded proximal end 50 of pill ram 48. Ram screw lever 64 has external threads 68 which are sized to engage complementary internal threads 70 formed at the proximal end of ram guide 16.

Ram guide 16 includes an axially extending slot 72 extending about halfway along its length. Slot 72 is sized and positioned to accommodate the distal end of pin 58. Slot 72 is covered by a slot cover 74 which is secured to the remainder of ram guide 16, such as by using an adhesive. Slot cover 74 has an internal, proximal ledge 76 positioned to engage pin 58 when pill ram assembly 6 has been moved from the use position of FIG. 3 to the retracted position of FIG. 5. Slot cover 74 functions as a part of ram guide 16, but is provided to permit positioning of pin 58 within slot 72.

Screw 38 and pin 58 are preferably of stainless steel and O-ring is of a suitable elastomeric material. The remainder of the components of pill press 2 are preferably made from transparent or translucent polycarbonate, polyproplene or other biocompatible material.

Figure 3:
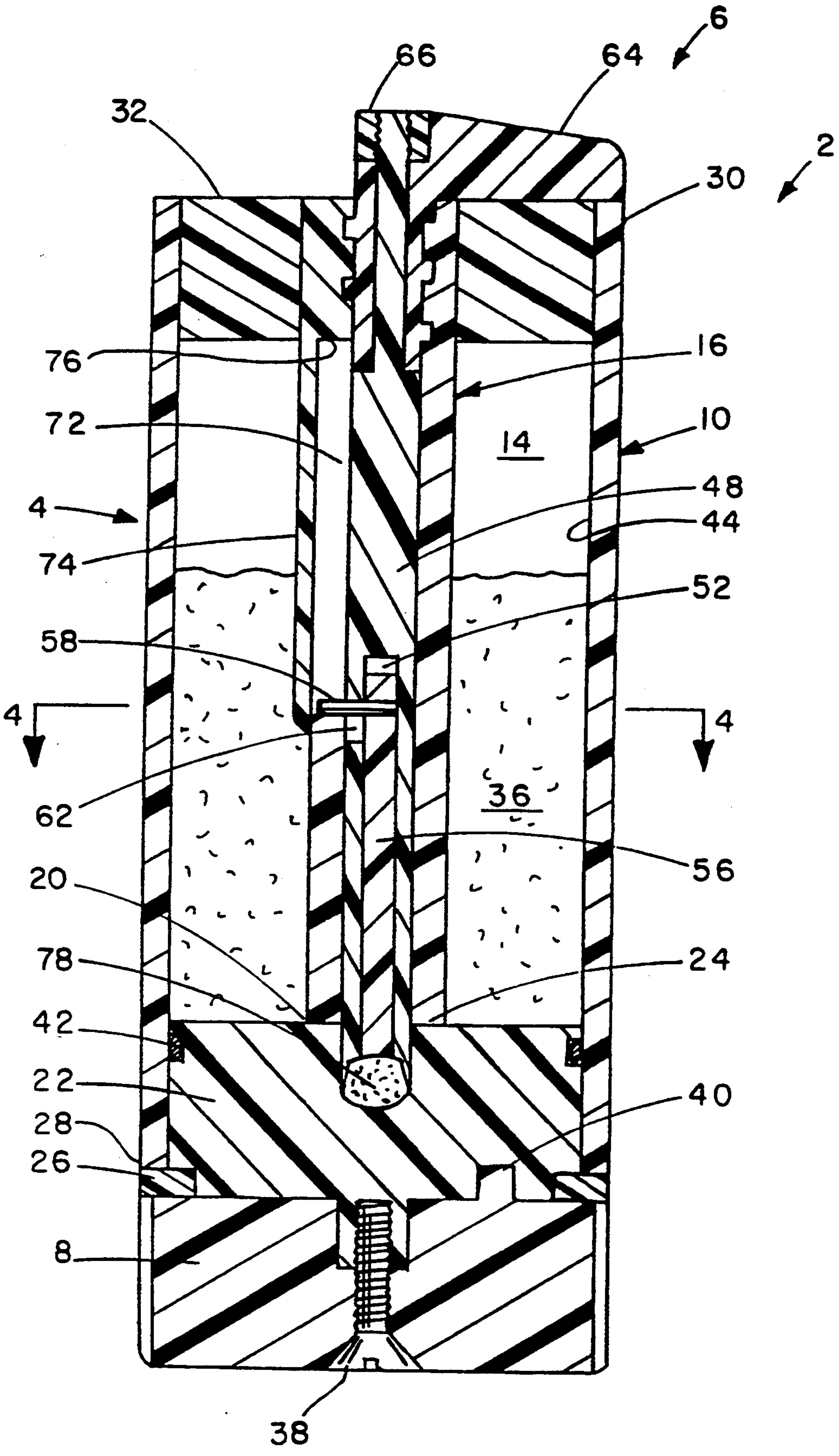
FIG. 3 is a longitudinal cross-sectional view of the pill press of FIG. 1 taken along line 3—3 of FIG. 4 with the pill ram assembly in the use position, having just compressed a quantity of powdered pharmaceutical to form a pill.
Figure 4:
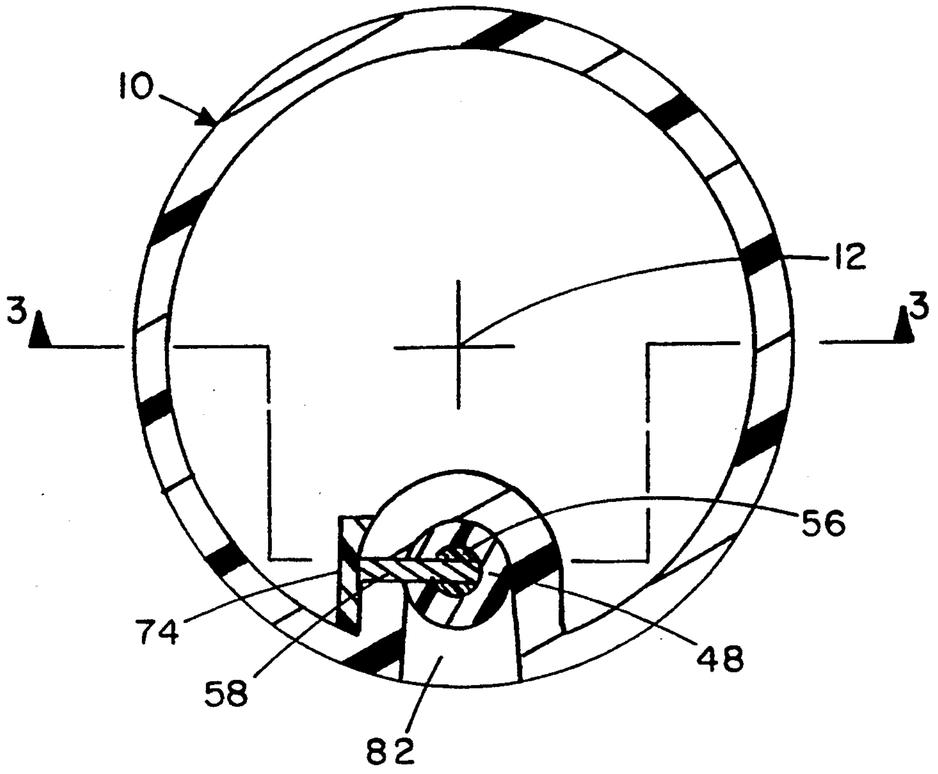
FIG. 4 is a cross-sectional view taken along line 4—4 of FIG. 3.

In use, a pill press 2, with powdered pharmaceutical 36 contained within interior 14, has ram screw lever 64 unthreaded from within ram guide 16 so that distal end 54 of pill ram 48 is external of pill forming cavity 46. This permits the user to rotate dosing knob 8, and with it cavity form 22, and fill the cavity 46 having the desired depth (to provide the desired dose) with powdered pharmaceutical 36. Dosing knob 8 is then used to reposition the chosen cavity 46 beneath ejector rod 56, after which ram screw lever 64 is threaded into ram guide 16, thus forcing distal end 54 of pill ram 48 into pill forming cavity 46. This compresses powdered pharmaceutical 36 to form pill 78, as shown in FIG. 3. Since cavity form 22 and main body 10 are clear or translucent, pill 78 is visible to the user. Cavity form 22 has pill-size markings 84 to allow the user to determine the size, and therefore the dose, of pill 78.

When in this use position of FIG. 3, the distal end 80 of ejector rod 56 also presses against powdered pharmaceutical 36 when forming pill 78. Thus, the combination of the distal ends 54, 80 of pill ram 48 and ejector rod 56 form the concavity within which pill 78 is formed. Because of this, pill 78 remains attached to distal end 54 of pill ram 48 as ram screw lever 64 is unthreaded from within ram guide 16 and the ram assembly is continued to be pulled in a proximal direction until pin 58 contacts ledge 76. At this point, pin 58 stops while pill ram 48 continues to move proximally a short distance limited by slot 62, thus pulling distal end 54 of pill ram 48 away from pill 78 forcing the pill from within the concave distal end 54 of pill ram 48. This occurs with distal end 54 positioned opposite a pill outlet 82 formed in main body 10 so that the ejected pill can simply drop into the user's hand or any suitable container. Once pill 78 is ejected, the procedure can be repeated to form a new pill.

Figure 5:
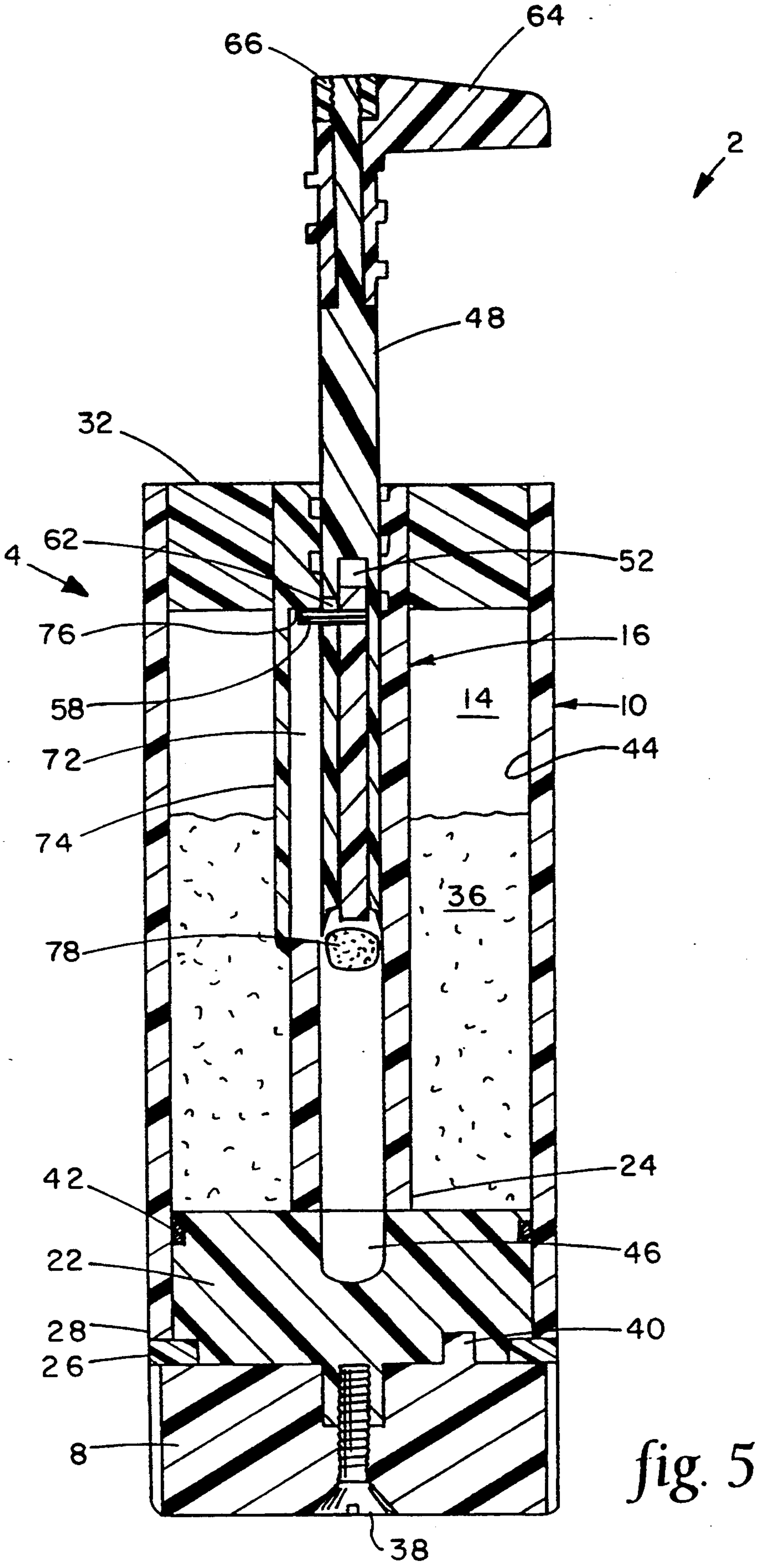
FIG. 5 is a view similar to that of FIG. 3, but showing the pill ram assembly in the retracted position causing the ejector element to drive the formed pill from the ram portion of the pill ram for ejection through the pill outlet in the housing.

To obtain a larger dose, the user could move pill ram 48 only partly away from the use position of FIG. 3 towards the retracted position of FIG. 5 and then rotate dosing knob 8. This would allow additional powdered pharmaceutical 36 to enter the previously-used cavity 46. The pill forming step could then be repeated to obtain a larger-dose pill.

Various other methods for controlling the pharmaceutical dose of pill 78 can be used. One way is to use different cavity forms 22, each having a set of cavities 46 of different depths according to the thickness and thus the dose of pill 78. Another method could be to make pill forming cavity 46 as a cylinder with the base being formed by a piston. The position of the piston within the cavity could be adjusted after, for example, first removing dosing knob 8. Another method which could be used would be to provide a mechanism which would allow the user to control how much powdered pharmaceutical 36 is deposited into cavity 46. One method would be to use a rotatable dosing disk between cavity form 22 and distal end 24 of ram guide 16. Cavity form 24 could remain stationary and the dosing disk could have one or more pill holes which would pick up measured amounts of powdered pharmaceutical 36 and then, once registered with cavity 46, would deposit the pharmaceutical within the cavity. The user could adjust the dose by controlling the number of pill holes in the supplemental dosing disk which were filled with powdered pharmaceutical 36 and then registered with cavity 46.

Other modifications and variations can be made to the disclosed embodiment without departing from the subject of the invention as defined in the following claims. For example, pill ram assembly 6 could be modified to provide the user with sufficient force to create pill 78 using mechanisms other than screw threads, such as toggle mechanisms, to create a sufficient mechanical advantage. Main body 10 need not be cylindrical.

What is claimed is:

1. A manually operated, controlled dose pill press for making a pill of a chosen dose from a supply of a powdered pharmaceutical comprising:

a housing having an interior containing the supply of the powdered pharmaceutical;

a pill cavity form, including a pill forming cavity, mounted to the housing;

means for transferring said chosen dose of said pharmaceutical from said supply to said cavity; and a manually operated pill ram assembly movably mounted to the housing having a ram portion moveable between a retracted position exterior of the pill forming cavity and a use position within the pill forming cavity, said ram portion and said cavity configured to compress said chosen dose into said pill.

2. The pill press of claim 1 wherein the housing includes a main body and the cavity form is movably mounted to the main body.

3. The pill press of claim 2 wherein the transferring means includes means for moving the cavity form between a pill press position, at which said cavity is aligned with said ram portion of said pill ram assembly, and cavity fill position, at which said cavity opens into the interior of the housing for transfer of powdered pharmaceutical into said cavity.

4. The pill press of claim 3 wherein the moving means includes a rotatable knob which causes the cavity form to rotate within the main body.

5. The pill press of claim 1 wherein the pill ram assembly includes a pill ram reciprocatingly mounted to the housing, the pill ram including said ram portion of said pill ram assembly.

6. The pill press of claim 5 wherein the pill ram assembly includes a pill ram driver operably coupled to the pill ram.

7. The pill press of claim 6 wherein the pill ram driver and the housing include threaded coupling means for threadably coupling the pill ram driver to the housing so to permit the ram portion to be driven into said cavity through the threaded engagement of said threaded coupling means.

8. The pill press of claim 5 further comprising means for ejecting the pill from the pill press.

9. The pill press of claim 5 wherein the ram portion is concave so that the pill moves with the ram portion as the pill ram assembly moves from the use position towards the retracted position.

10. The pill press of claim 9 wherein the pill ram includes a ram axis and an axial opening formed within the pill ram extending from the ram portion along the ram axis.

11. The pill press of claim 10 further comprising an ejector element mounted with the axial opening, a part of the ejector element being engageable with the pill when the pill ram assembly is moved from the use position towards the retracted position so to dislodge the pill from the ram portion of the pill ram assembly when the ram portion is at an eject position along said ram axis.

12. The pill press of claim 11 wherein the housing includes a pill outlet at said eject position through which the pill can pass out of the pill press when dislodged from the ram portion by the ejector element.

13. The pill press of claim 12 wherein the housing is cylindrical and has a housing axis, and wherein the ram axis is positioned parallel to but radially offset from the housing axis.

14. The pill press of claim 1 further comprising means for varying said chosen dose.

15. The pill press of claim 14 wherein the chosen dose varying means includes a plurality of different size cavities.

16. A manually operated, controlled dose pill press for making a pill of a chosen dose from a supply of a powdered pharmaceutical comprising:

a housing having an interior defining a housing axis and containing the supply of the powdered pharmaceutical;

a pill cavity form, including a plurality of different-size pill forming cavities, movably mounted to the housing;

means for transferring said chosen dose of said pharmaceutical from said supply to a chosen one of said cavities;

a manually operated pill ram assembly including a pill ram reciprocally mounted to the housing and a pill ram driver coupled to the pill ram, the pill ram having a ram portion moveable between a retracted position exterior of the chosen pill forming cavity and a use position within the chosen pill forming cavity, said ram portion and said chosen cavity configured to compress said chosen dose into said pill;

the pill ram being positioned parallel to but radially offset from the housing axis;

the transferring means including means for moving the cavity form between a pill press position, at which said chosen cavity is aligned with said ram portion of said pill ram assembly, and cavity fill position, at which said chosen cavity opens into the interior of the housing for transfer of powdered pharmaceutical into said chosen cavity; and means for ejecting the pill from the pill press.

17. A method for making a pill having a chosen dose of a powdered pharmaceutical comprising the following steps:

providing a hand-held housing containing a multi-dose supply of the powdered pharmaceutical;

transferring the chosen dose of the powdered pharmaceutical from the supply into a pill forming cavity;

manually compressing the powdered pharmaceutical in the cavity to form the pill; and releasing the pill from the housing.

18. The method of claim 17 wherein the transferring step is carried out by rotating a knob mounted to the housing to move the pill forming cavity to a cavity fill position at which said pharmaceutical enters said cavity.

19. The method of claim 17 wherein the manually compressing step includes the step of threading a pill ram into the housing to a use position.

20. The method of claim 19 wherein the pill releasing step is carried out by ejecting the pill through an opening in the housing.

21. The method of claim 20 wherein the pill is ejected upon moving the pill ram from the use position towards a retracted position.

22. The method of claim 17 further comprising the step of selecting the chosen dose.

23. The method of claim 22 wherein the chosen dose selecting step is carried out by selecting a pill forming cavity of a desired depth.

* * * * *